US006565139B2

United States Patent
Bayerle et al.

(10) Patent No.: US 6,565,139 B2
(45) Date of Patent: May 20, 2003

(54) VEHICLE CANOPY

(75) Inventors: Jess J. Bayerle, McGrath, MN (US); Edward J. Carlson, Milaca, MN (US)

(73) Assignees: Jess Bayerle, McGrath, MN (US); Edward Carlson, Milaca, MN (US)

( * ) Notice: Subject to any disclaimer, the term of this patent is extended or adjusted under 35 U.S.C. 154(b) by 0 days.

(21) Appl. No.: 10/040,828

(22) Filed: Jan. 8, 2002

(65) Prior Publication Data

US 2002/0089207 A1 Jul. 11, 2002

Related U.S. Application Data

(60) Provisional application No. 60/261,102, filed on Jan. 11, 2001.

(51) Int. Cl.[7] .................................................. B60N 1/00
(52) U.S. Cl. ....................... 296/77.1; 135/127; 135/128; 296/159
(58) Field of Search ............................. 296/77.1, 102, 296/79, 159, 161, 163, 78.1; 135/128, 133, 88.05, 88.06, 115, 121, 127; 52/63

(56) References Cited

U.S. PATENT DOCUMENTS

| | | | | |
|---|---|---|---|---|
| 780,288 A | * | 1/1905 | Mendell ..................... | 296/77.1 |
| 860,379 A | * | 7/1907 | Hodes ........................ | 296/77.1 |
| 3,693,641 A | * | 9/1972 | Moss ......................... | 135/127 |
| 3,794,054 A | * | 2/1974 | Watts ......................... | 135/127 |
| 4,202,363 A | * | 5/1980 | Watts et al. ................. | 135/127 |
| 4,590,956 A | * | 5/1986 | Griesenbeck ............... | 135/127 |
| 4,652,040 A | * | 3/1987 | Mahan ....................... | 296/159 |
| 4,657,299 A | * | 4/1987 | Mahan ....................... | 296/159 |
| 4,790,340 A | * | 12/1988 | Mahoney ................... | 135/127 |
| 4,950,017 A | | 8/1990 | Norton ....................... | 196/77.1 |
| 4,973,082 A | * | 11/1990 | Kincheloe .................. | 296/78.1 |
| 5,072,694 A | * | 12/1991 | Haynes et al. .............. | 135/127 |
| 5,203,601 A | | 4/1993 | Guillot ....................... | 296/77.1 |
| 5,370,145 A | * | 12/1994 | Wu ............................ | 135/127 |
| 5,441,069 A | * | 8/1995 | Moss ......................... | 135/124 |
| 5,785,333 A | * | 7/1998 | Hinkston et al. .......... | 296/77.1 |
| 5,857,477 A | * | 1/1999 | James ..................... | 135/88.06 |
| 5,901,727 A | * | 5/1999 | Kramer et al. ............. | 135/128 |
| 5,961,175 A | | 10/1999 | Clardy, Jr. .................. | 296/102 |
| 6,067,676 A | * | 5/2000 | Carnahan et al. ........... | 135/128 |
| 6,102,468 A | * | 8/2000 | Lowrey et al. ............. | 296/173 |
| 6,116,256 A | * | 9/2000 | Pawsey et al. ............. | 135/128 |
| 6,206,446 B1 | * | 3/2001 | Slayden ..................... | 296/77.1 |
| 6,296,297 B1 | * | 10/2001 | Barrow et al. .............. | 296/169 |
| 6,371,143 B1 | * | 4/2002 | Swetish ..................... | 135/128 |
| 6,402,220 B2 | * | 6/2002 | Allen ......................... | 296/77.1 |
| 6,415,806 B1 | * | 7/2002 | Gillis ......................... | 135/127 |
| 2001/0007260 A1 | * | 7/2001 | Rousselle et al. .......... | 135/126 |

\* cited by examiner

*Primary Examiner*—Kiran Patel
(74) *Attorney, Agent, or Firm*—Vidas, Arrett & Steinkraus

(57) ABSTRACT

A removable cover for a vehicle may be comprised in a kit. The removeable cover comprises a plurality of curved elongate support members, and a flexible cover. Each of the support members has a first end and a second end. The first end adapted to engage a predetermined portion of the vehicle, the second end adapted to engage a junction member, such that when the first end of each of the plurality of curved elongate support members are engaged to the predetermined portions of the vehicle the second end of each of the curved elongate support members are engaged to the junction member. The junction member being supportively positioned above the vehicle by the plurality of curved elongate support members. The flexible cover overlaying the support members and being engaged to the front and rear portions of the vehicle.

18 Claims, 3 Drawing Sheets

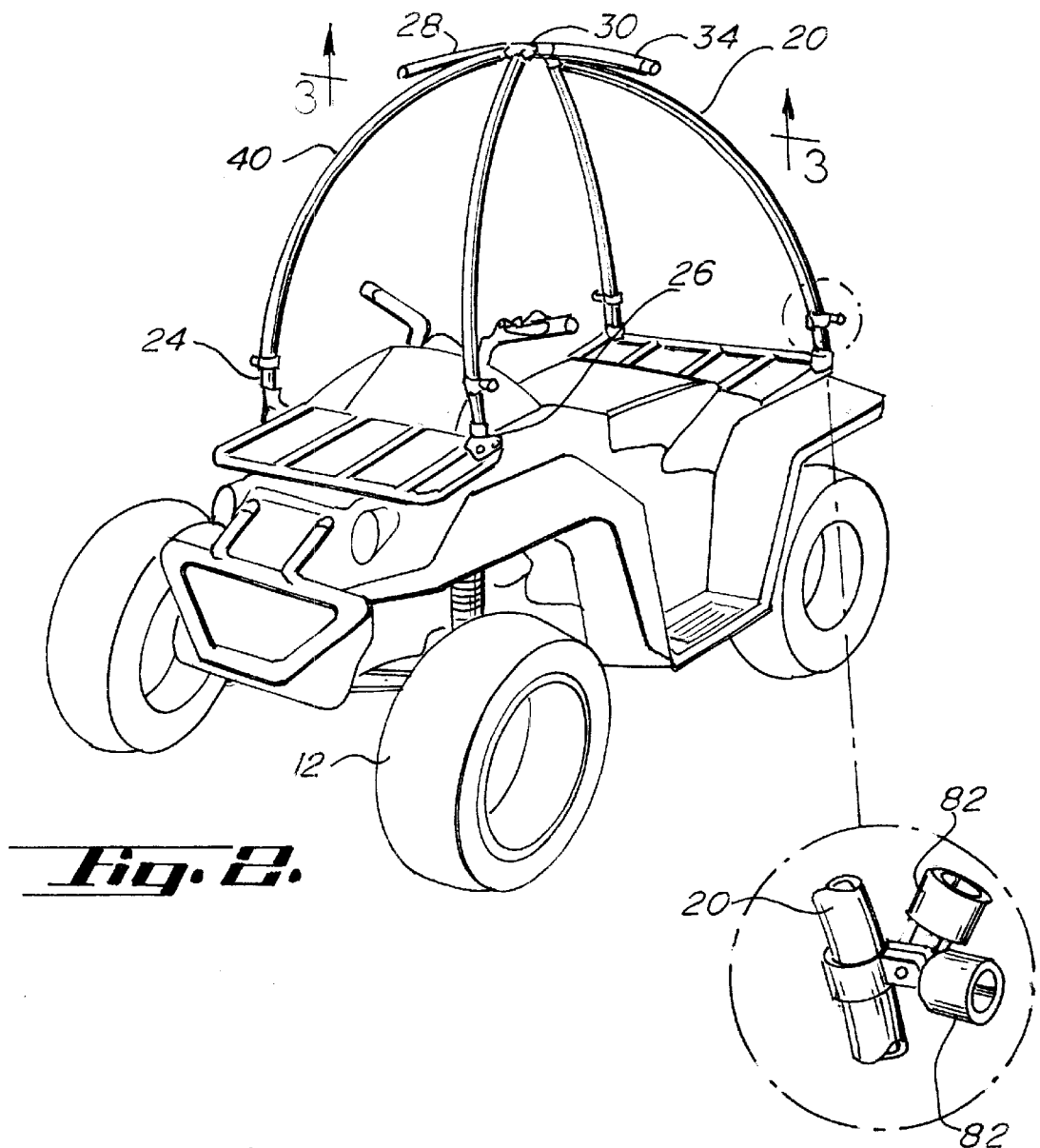
Fig. 2.
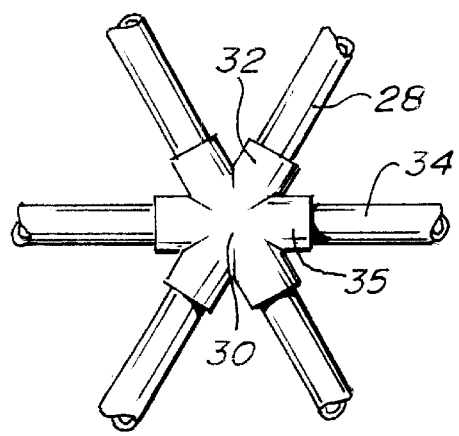
Fig. 3.
Fig. 5.

VEHICLE CANOPY

CROSS-REFERENCE TO RELATED APPLICATIONS

This application claims priority from U.S. provisional application No. 60/261,102, filed Jan. 11, 2001, the entire contents of which are incorporated herein by reference.

STATEMENT REGARDING FEDERALLY SPONSORED RESEARCH

Not Applicable

BACKGROUND OF THE INVENTION

1. Field of the Invention

Embodiments of this invention relate to hunting and recreational vehicles and more particularly, to a support frames and covers adapted for attachment to recreational vehicles including all-terrain vehicles, such as "four-wheelers," "three-wheelers," and snowmobiles and other recreational vehicles hereinafter collectively referred to as ATVs.

2. Brief Description of the Related Art

A well known problem which exists in the use of uncovered ATVs, is exposure of the driver to the elements. These vehicles are designed for operation in the manner of a motorcycle and usually do not even incorporate a windshield for protection of the driver.

Various structures for covering ATVs and providing shelter to the occupant(s) therein are known in the art. U.S. Pat. No. 4,950,017, dated Aug. 21, 1990, to Norton, describes a kit for a removable top assembly for all-terrain vehicles. The kit includes a pair of upright support bows which flexibly support a top cover and a front wind screen. However, while the Norton kit may provide protection to the ATV driver from the front and above the vehicle, the Norton kit does not provide the driver with any side protection, such as side doors or windows.

In U.S. Pat. No. 5,961,175, dated Oct. 5, 1999 to Clardy, describes a vehicle canopy which surrounds the upper body of the driver of an ATV. The canopy consists of multiple frames which are connected together to form a rigid canopy. The sides of the canopy are enclosed with two flexible side windows which are moveable to allow a driver to enter and exit the vehicle.

U.S. Pat. No. 5,203,601, dated Apr. 20, 1993 to Guillot, describes a frame and cover for an ATV which address some of the short-comings of previous cover designs by providing an ATV with a rigid cover that completely encloses the driver on all sides. However, the Guillot frame design does not facilitate ready installation and/or removal from an ATV. In addition, it would be impractical to remove, break down and store the Guillot frame on the ATV when the frame is not in use, particularly if the ATV were hauling additional cargo.

The present invention differs from the prior ATV covers by providing a cover which may be readily attached to an ATV to provide the driver with a canopy which may be configured to partially or entirely enclose the driver. The canopy of the present invention may also be readily removed from the ATV and be broken down for compact storage and transport. In addition, the present canopy, when in place over an ATV, may be fitted with additional canopy structures to provide a parked ATV with a fully enclosed vestibule or tent-like shelter adjacent to the ATV and which may also provide a connecting structure which may link shelters of adjacent ATVs.

All U.S. patents and applications and all other published documents mentioned anywhere in this application are incorporated herein by reference in their entirety.

The invention in various of its embodiment is summarized below. Additional details of the invention and/or additional embodiments of the invention may be found in the Detailed Description of the Invention below.

The abstract provided herewith is intended to comply with 37 CFR 1.72 and is not intended be used in determining the scope of the claimed invention.

BRIEF SUMMARY OF THE INVENTION

The present invention provides a cover for an ATV which is readily attachable and detachable to and from the vehicle. The cover of the present invention has a variety of configurations which provides the driver of the ATV with a wide variety of coverage options.

Some embodiments of the invention are directed to a vehicle frame and cover which may be characterized as a support frame designed to be removably or fixedly mounted to substantially any ATV. The cover is a flexible cover which may have a variety of fasteners for ready engagement and disengagement from the support frame. In some embodiments both the cover and frame may be quickly and easily removed from the ATV as desired.

In at least one embodiment of the invention the cover is a canopy the is disposed in front, above and behind the driver leaving the sides of the rider exposed.

In at least one embodiment of the invention side panels may be attached to the canopy to completely enclose the driver.

In some embodiments the support frame and cover may be configured to enclose driver of the ATV as well as any passenger or cargo as desired.

The invention may also be embodied to include one or more vestibules and additional enclosures which may be attached to the vehicle canopy to provide a stationary ATV with an attached shelter. The attached shelter may be readily engaged to one of the open sides of the canopy thereby allowing the canopy and shelter to provide the ATV as well as an area adjacent thereto with protection from the elements. Such a shelter would allow a driver to utilize the present invention as a hunting blind, a fish house, etc.

The canopy may be configured to include one shelter or two shelters attached thereto. Each shelter is configured to be engaged to an open side of the canopy. In some embodiments a connecting shelter may be provided to link the canopy of multiple ATVs.

In at least one embodiment of the invention, the shelter includes a skirt, the skirt extends from the first portion of the shelter to the ground.

In at least one embodiment of the invention, the skirt has end regions which may be engaged to the front and rear of the ATV as well as a second shelter skirt which is located on the opposite side of the vehicle.

The canopy as well as any adjacent shelters are easily set up and/or removed from the ATV. Both the canopy and the shelter are comprised of flexible covers which overlay a plurality of support member. The various support members may be flexible or rigid and are readily engageable to a variety of surfaces and/or structure on the ATV. When removed from the ATV and fully collapsed, the various components of the present invention may be bundled together in a relatively light weight, low volume package which is easily transportable by the ATV, even in the presence of a significant amount of additional cargo.

The material of the flexible cover of the canopy and shelter is preferably water resistant and may in fact be waterproof. The material may also include one or more transparent sections which act as windows for the driver or other person to see through. The windows may be flexible transparent plastic or some other substantially transparent material.

As is apparent from the above brief description, the present invention may be embodied in a variety of ways to provide an ATV and the ATV driver and/or other persons with a wide range of coverage options.

BRIEF DESCRIPTION OF THE SEVERAL VIEWS OF THE DRAWINGS

A detailed description of the invention is hereafter described with specific reference being made to the drawings in which:

FIG. 2 is a perspective view of the embodiment of the invention shown in FIG. 1 prior to the canopy and optional door being attached;

FIG. 3 is a top down view of the junction member;

FIG. 5 is a perspective close up view of a connector; and

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
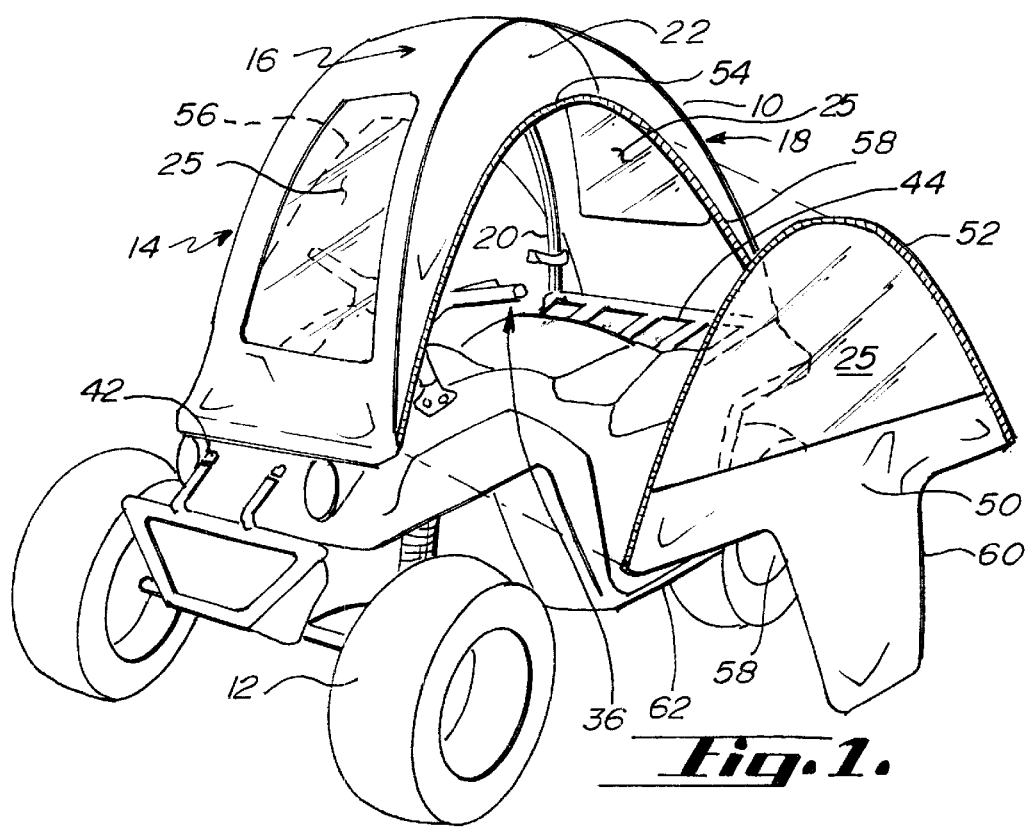
FIG. 1 is a perspective view of an embodiment of the invention.

As may be seen in FIG. 1, the present invention is directed to a cover or canopy 10 which may be readily attached as well as removed from an ATV 12 as desired. The canopy 10 is configured to provide an adult sized driver (not shown) with protection from external elements such as wind and rain. Because ATVs are designed to move at fairly high speeds, the primary direction from which adverse weather conditions will affect the driver of the ATV 12 is from the front of the vehicle and from above the vehicle, the present canopy 10 is provided with a cover 22 having front portion 14, and a top portion 16, to protect the driver from the vast majority of inclement weather conditions. The cover 22 is also equipped with a rear portion 18 which protects the driver from behind as well.

The canopy 10 of the present invention has two primary components: a plurality of support members 20 and a flexible cover 22. As may best be seen in FIG. 2, the tubular support members 20 have first ends 24 which may be connected to various engagement points 26 about the ATV 12. Because ATV's come in a variety of shapes, sizes, and configurations, the ends 24 are designed to engage a variety of surfaces on the ATV. As a result, the ends 24 may be configured to include any of one or more of a variety of fastening devices known. For example, the ends may include, straps, bungee cord, ties, nut and bolt arrangements, quick release fasteners, clamps, hooks, hook and loop material such as VELCRO, etc. The ends 24 may be magnetic, may include threads and may have one or more through holes to allow cords and hooks to be engaged thereto. Other fastener types besides those listed herein may also be provided for.

In order to provide for improved compactability of the cover 10, the members 20 may be segmented, foldable via on or more hinges or pivots, collapsible or otherwise reducible in length.

As may best be seen in FIG. 3, the other end 28 of the support members 20 are engaged to a junction member 30. The junction member 30 has a number of engagement ports 32 which correspond to the number of members 20. Each end 28 is inserted into a port 32.

When ends 24 are properly engaged to the engagement points 26 and ends 28 are inserted into the engagement ports 32 of the junction member 30, the support members 20 provide a cage or framework 40 upon which the flexible cover 22 (shown in FIG. 1) may be placed.

The flexible cover 22, shown in FIG. 1 is designed to be supported by the support members 20 and engaged to the front 42 and to the rear 44 of the ATV 12. By engaging the front portion 14 of the cover 22 to the front 42 of the ATV and the rearward portion 18 of the cover 22 to the rear 44 of the ATV 12, the cover 22 is drawn taut over the members 20. The front and rear portions 14 and 18 may be engaged to the respective portions 42 and 44 of the ATV by a variety of fastener types such as those previously described. When engaged in the manner shown in FIG. 1, the cover 22 may be configured to provide coverage over the driver of the ATV as well as the cargo racks of the ATV if desired. In addition, when properly affixed to the ATV 12 and supported by the members 20, the canopy 10 is capable of substantially retaining its shape at highway speeds. As a result, there is no need to remove the canopy 10 from the ATV 12 when transporting the ATV at highway speed.

Because of the flexible nature of the cover 22, the material of the cover may tend to be slack or droop where the support members 20 do not act to stretch or engage the cover 22. As such the canopy 10 may be equipped with a plurality of billowing members 34 which act to provide additional support members to draw out the cover 22. In addition, the billowing members act to enlarge the enclosure 36 created by the canopy 10.

As may be seen in FIG. 3, in addition to the engagement ports 32, the junction member 30 also has at least two additional ports 35 into which the billowing members 34 are inserted. The billowing members 34, such as may best be seen in FIG. 2, extend outward from the junction member 30 to a distance sufficient to provide the cover 22 with a tight fit thereover, but not so far as to potentially damage or tear the cover 22. The billowing members 34 may be configured to have blunted or rounded ends 38 to prevent accidental tearing or penetration of the cover material.

The cover 22 may be constructed from a variety of materials. For example the cover 22 may be woven natural or artificial cloth such as cotton and/or polyester, the cover 22 could also be manufactured from natural rubber, artificial rubber, silicon, TEFLON based materials, KEVLAR, plastic or other polymer material, etc. Any material may be made water resistant and/or water proof by application of a sealant or coating as are known.

The material of the cover 22 may also be transparent to provide the driver with one or more windows 25. The windows 25 may be removable from the cover 22 or alternatively they may be fixedly engaged to the cover 22. The windows 25 may be constructed from a variety of materials, but will typically be a transparent flexible plastic.

As is shown in FIG. 1, the canopy 10 may also be provided with one or more side panels or doors 50. The doors 50 are each equipped with an engagement surface 52 which may be engaged to the right side 54 or left side 56 of the cover 22. The engagement surface 52 and the appropriate side 54 or 56 may have corresponding fastening means 58 such as a zipper or VELCRO or any of a variety of fastener devices such as for example those previously described above. The doors 50 also have a lower edge 60 which may also include one or more fastening means 58 to provide the lower edge 60 with the ability to be removably engaged to a lower portion 62 of the ATV 12.

Figure 4:
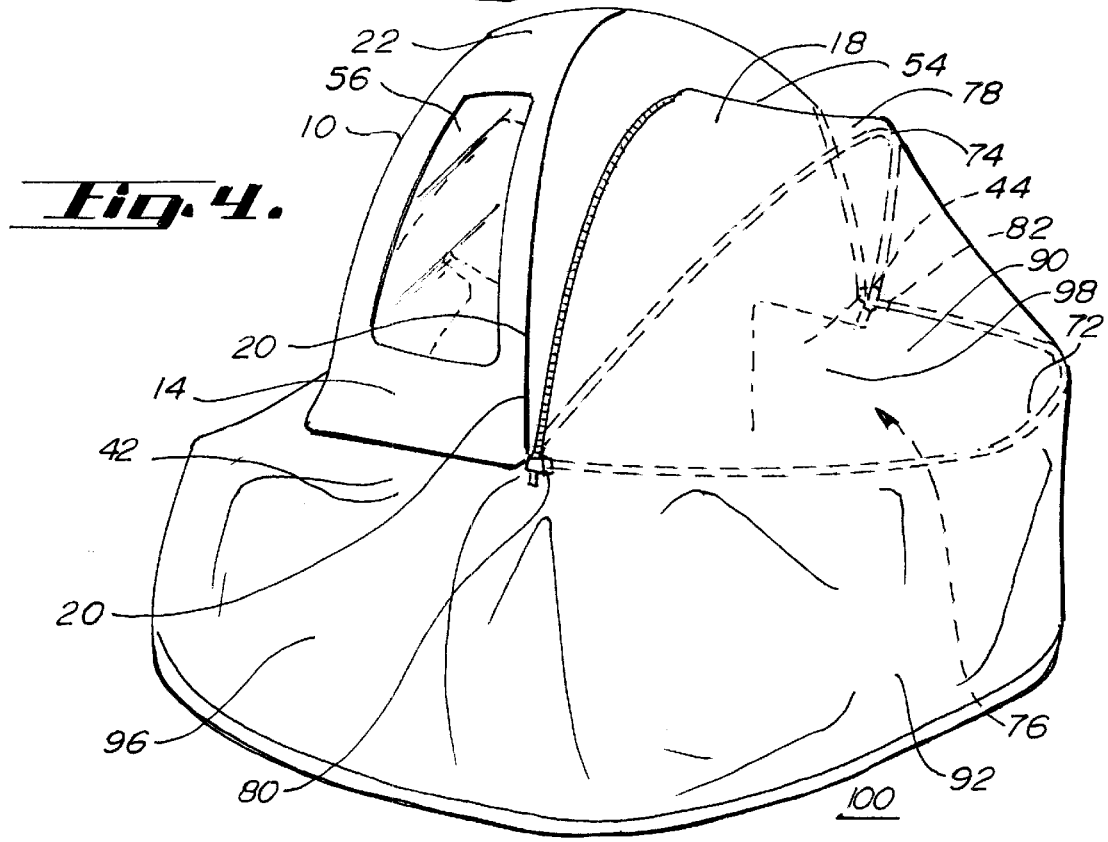
FIG. 4 is a perspective view of the embodiment of the invention shown in FIG. 1, wherein the optional door is replaced with an optional skirt and optional shelter.

In an alternative embodiment of the invention shown in FIG. 4, in place of one or both doors 50, a shelter 70 may be affixed to the side 54 of the cover 22.

The shelter 70 is comprised of at least two shelter support members 72 and 74 which are engaged to and supported between a pair of the members 20 previously described. The support members 72 and 74 may be flexible or rigid but are characterized as having a bowed configuration when in place between the two members 20. the bowed configuration of the members 72 and 74 defines an shelter enclosure 76 adjacent to the ATV 12.

The first or primary support member 72 extends outwardly from the ATV 12 substantially perpendicular to the members 20. The secondary support member 74 is positioned between the primary member 72 and the cover 22 to provide the enclosure 76 with a predetermined height.

The ends 80 of the members 72 and 74 are adapted to be received into connectors 82 positioned on each of the members 20. The connectors 80 may be moveable or fixedly positioned on the members 20. The connectors as shown in FIG. 5, are positioned such that the angular displacement of the primary member 72 relative to the secondary member 74 is set thereby providing the shelter 70 with greater ease of construction.

Overlaying the members 72 and 74 is a shelter cover 78, the shelter cover includes a first or top portion 90 and a second or skirt portion 92. The top portion 90 overlies the members 72 and 74. The top portion 90 is engaged to the side 54 or 56 of the cover 22 in the same manner as the door 50. The top portion 90 may include a fastening means such as previously described to allow the top portion 90 to be engaged to the primary support member 72 and/or 74. The top portion is preferably taut over the members 72 and 74, but may be loosely displaced thereover if desired.

Extending from the top portion 90 is the skirt 92. The skirt may be integral with the top portion 90 or may be removably engaged thereto. The skirt extends downward from the top portion 90. The skirt 92 may be configured to extend all the way to the ground 100 to provide a substantially sealed enclosure adjacent to the ATV 12.

The skirt may also be characterized as having a front region 96 and a rear region 98. The front region 96 may be engaged to the front portion 42 of the ATV 12 as well as to the front 14 of the cover 22. The rear region 98 may be engaged to the rear portion 44 of the ATV and/or the rear portion 18 of the cover 22.

Where the ATV 12 is equipped with a shelter 70 on both sides 54 and 56 of the cover 22, the front region of each shelter may be engaged to one another, while the rear regions of each shelter may also be engaged to one another.

In some embodiments of the invention, the shelter 70 may be readily broken down into its components and folded or other wise collapsed into a compact form which is readily transportable on the ATV 12. As a result, ATV 12 may be provided with an easily constructed shelter 70 that is capable of being transported from one location to another with minimal inconvenience.

Figure 6:
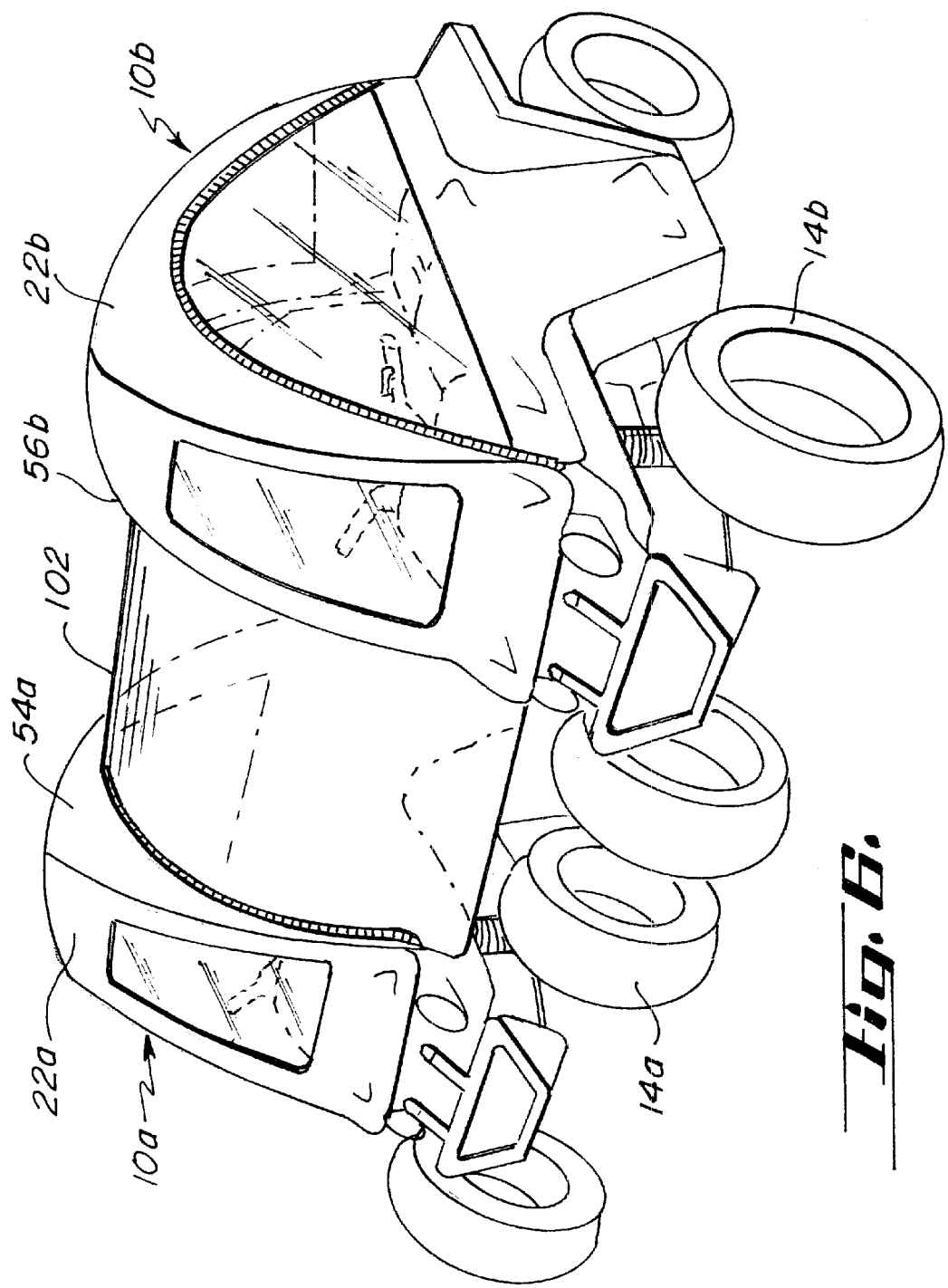
FIG. 6 is a perspective view of an embodiment of the invention wherein multiple embodiments of the invention such as are shown in FIG. 1 are connected together by an optional connection tunnel.

Turning to FIG. 6 in yet another embodiment of the invention, a tunnel or connector 102 may be positioned between two adjacently parked ATVs 14a and 14b each of which are equipped with a canopy 10a and 10b. In the embodiment shown, the tunnel 102 extends from the left side 54a of one canopy 10a to the right side 56b of the adjacent canopy 10b. The tunnel 102 may be removably fastened to the respective sides of a pair of ATVs using any of the fastening devices previously described herein. In one embodiment the sides of the cover 22a and 22b have zippered surfaces which correspond to the zippered surfaces of the tunnel 102.

The tunnel may include one or more support members therein to provide structural support to the tunnel. If the ATVs 14a and 14b are properly positioned, the tunnel may be kept taunt thereby alleviating the need for additional structural support.

The shelter cover 78, and/or connection tunnel 102 may be constructed from the same material as the cover 22 or may be a different material as desired. Both the shelter cover 78 and/or the connection tunnel 102 may have one or more windows. The windows may be removable.

In addition to being directed to the specific combinations of features claimed below, the invention is also directed to embodiments having other combinations of the dependent features claimed below and other combinations of the features described above.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

What is claimed is:

1. A removable cover for a vehicle comprising:
   a plurality of curved elongate support members, each of the plurality of curved elongate support members having a first end and a second end, the first end adapted to engage a predetermined portion of the vehicle, the second end adapted to engage a junction member, such that when the first end of each of the plurality of curved elongate support members are engaged to the predetermined portions of the vehicle the second end of each of the curved elongate support members are engaged to the junction member, the junction member being supportively positioned above the vehicle by the plurality of curved elongate support members;

a flexible cover for disposition over the plurality of curved elongate support members, the flexible cover having a forward portion and a rearward portion, the forward portion constructed and arranged to engage at least a front portion of the vehicle, the rearward portion constructed and arranged to engage at least a rear portion of the vehicle, the cover being sized to be supportively and frictionally engaged by the plurality of curved elongate support members when the forward portion is engaged to the front portion of the vehicle and the rearward portion is engaged to the rear portion of the vehicle, when the flexible cover is disposed over the plurality of curved elongate support members the flexible cover and the plurality of curved elongate support members form an enclosure, the enclosure constructed and arranged to at least partially cover a driver of the vehicle.

2. The cover of claim 1 wherein the flexible cover has a plurality of fastener devices engaged thereto, each of the plurality of fastener devices adapted to be removably engaged to at least one of the plurality of curved elongate support members.

3. The cover of claim 1 wherein the forward edge has at least one fastener device engaged thereto, the at least one fastener device adapted to be removably engaged to at least a portion of the front portion of the vehicle.

4. The cover of claim 1 wherein the rearward edge has at least one fastener device engaged thereto, the at least one fastener device adapted to be removably engaged to at least a portion of the rear portion of the vehicle.

5. The cover of claim 1 wherein the flexible cover is constructed from a material selected from at least one member of the group consisting of: cloth, natural rubber, synthetic rubber, polymer materials, and any combinations thereof.

6. The cover of claim 5 wherein the material is water resistant.

7. The cover of claim 5 wherein the material is water proof.

8. The cover of claim 5 wherein at least a portion of the material is transparent.

9. The cover of claim 1 wherein the flexible cover farther comprises at least one window, the at least one window being transparent.

10. The cover of claim 9 wherein the at least one window is removable from the flexible cover.

11. The cover of claim 1 further comprising a first panel and a second panel, the flexible cover further comprising a first side and a second side, at least a portion of the first panel having a first panel engagement surface adapted to be removably engaged to the first side of the flexible cover, at least a portion of the second panel having a second panel engagement surface adapted to be removably engaged to the second side of the flexible cover.

12. The cover of claim 11 wherein the first panel is removably engaged to the first side with at least one first side fastener device and the second panel is removably engaged to the second side by at least one second side fastener device.

13. The cover of claim 12 wherein the fastener devices are selected from at least one member of the group consisting of zippers, ties, clips, buttons, straps, hook and loop material and any combinations thereof.

14. The cover of claim 11 wherein at least a portion of each of the panels is transparent.

15. The cover of claim 11 wherein each of the panels are characterized as being flexible.

16. The cover of claim 11 wherein each of the panels are sized to extend downward from the flexible cover, each of the panels having a bottom edge, the bottom edge having at least one fastener adapted to be removably engaged to an engagement surface of the vehicle.

17. The cover of claim 16 wherein when the first panel is engaged to the first side of the flexible cover and the second panel is engaged to the second side of the flexible cover, the panels forming sides to the enclosure, the enclosure constructed and arranged to completely surround the driver of the vehicle.

18. The cover of claim 1 further comprising at least two support posts, the at least two support posts constructed and arranged to be removably engaged to the junction member and opposingly extend laterally therefrom, the at least two support posts constructed and arranged to supportively and fictionally engage the flexible cover.

* * * * *